Patented Dec. 8, 1953

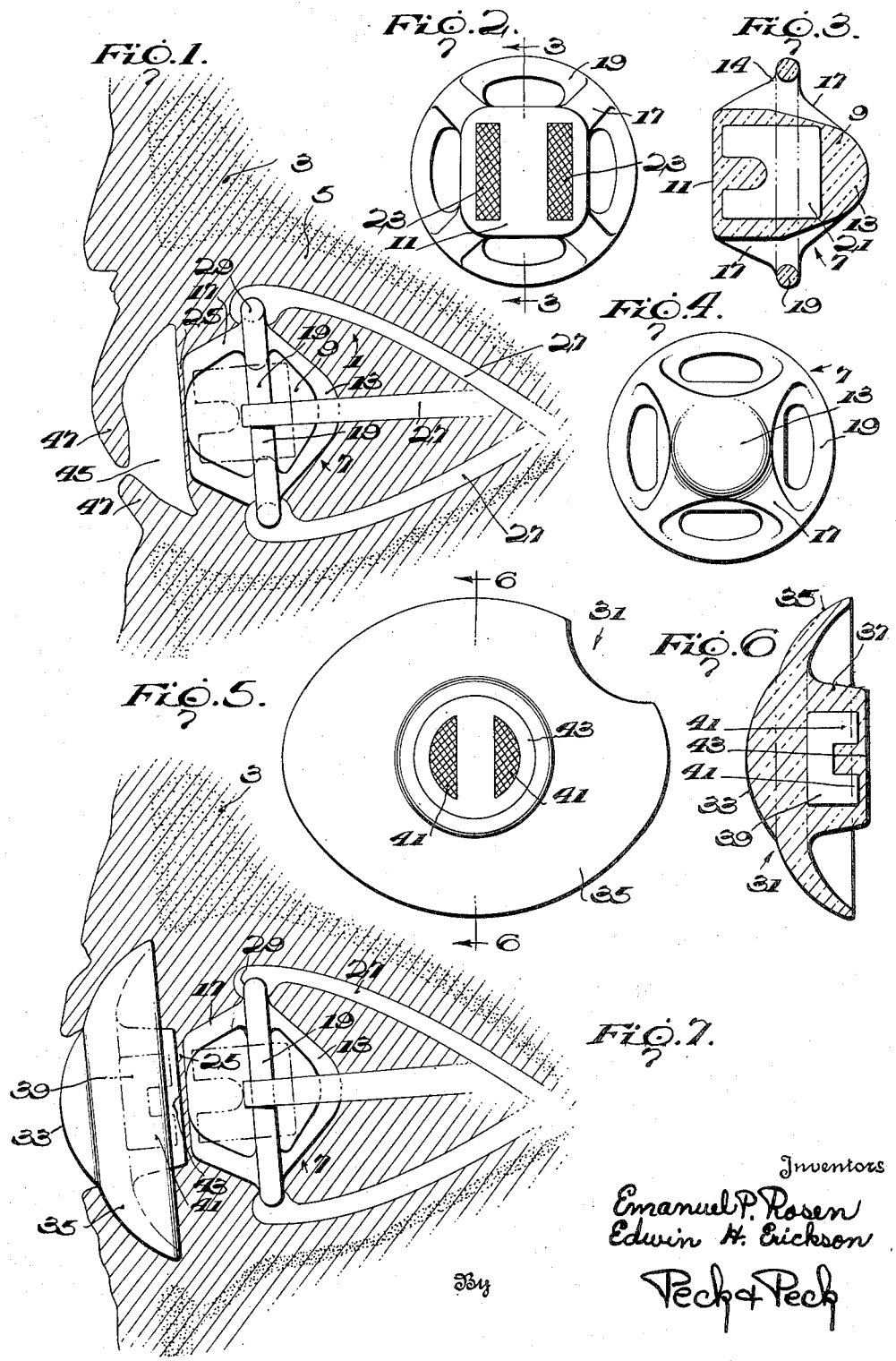

2,661,480

UNITED STATES PATENT OFFICE 2,661,480

ARTIFICIAL EYE AND CONTROLLING APPARATUS

Emanuel P. Rosen, Newark, and Edwin H. Erickson, Teaneck, N. J.

Application October 8, 1947, Serial No. 778,704

19 Claims. (Cl. 3—13)

This invention relates broadly to the art of prosthesis, and in its more specific aspects it relates to prosthetics and controlling means therefor whereby movements simulating those of the human eye are imparted to the prosthetic, to thereby greatly increase the realistic impression of the usually immobile prosthetic; and the nature and objects of the invention will be readily recognized and understood by those skilled in the arts to which it relates in the light of the following explanation and detailed description of the accompanying drawings illustrating what we at present believe to be the preferred embodiments and mechanical expressions of our invention from among various other forms, arrangements, combinations, and constructions, of which the invention is capable within the spirit and scope thereof.

In the conventional mounting and arrangement of a prosthetic, or artificial eye within the human eye socket, no means or apparatus is usually provided for imparting or transmitting movement to the prosthetic and thus the prosthetic, even though it may well simulate the human eye in appearance, lacks normal and realistic eye movements. Obviously such mounting and arrangement of a prosthetic results in a stare by one eye, there being no coordination with the other human eye and the wearer has a somewhat unpleasant appearance. Some practical and simple means has long been sought by workers in this art whereby the usual prosthetic may be governed and controlled by the human extra ocular muscles to produce realistic and normal eye movements in the prosthetic. It will be readily recognized that the production of a prosthetic having normal eye movements is highly advantageous, and would be, of inestimable satisfaction to those individuals equipped with an artificial eye or prosthetic. It is therefore a fundamental object of our invention to provide a prosthetic and controlling apparatus therefor which will produce normal and realistic eye movements to the prosthetic.

Another object of our invention is to provide a prosthetic and controlling apparatus therefore which are controlled by the six extra ocular muscles which have been severed from the eye in the enucleation process.

We are aware that means have heretofore been developed for so mounting a prosthetic that eye movements will be transmitted thereto, however such means, so far as we know, have not been entirely satisfactory due to the fact that the mounting and arrangement of the apparatus involved in attempting to transmit normal eye movements to the prosthetic have often resulted in infection in the eye socket and in the extrusion of elements of the apparatus being used. Thus it is a further purpose of our invention to provide a prosthetic and controlling apparatus therefor whereby normal eye movements are imparted to the prosthetic, the mounting and arrangement being such that the chance of infection is substantially eliminated and the possibility of extrusion of elements of the apparatus is substantially eliminated.

In devising a prosthetic and controlling apparatus therefor which is endowed with the aforementioned and other highly advantageous characteristics and advantages we have conceived of a method of enucleation which involves surgical steps saving and utilizing certain of the eye structure for combination with the prosthetic and controlling apparatus whereby we are enabled to substantially eliminate the above-mentioned extrusion possibility as well as the chance of infection which is prevalent in the apparatuses involving more than one element which have heretofore been known in the art.

The proposal of this invention consists in the provision of a prosthetic and a separate controlling element therefor which is mounted within the inner portion of the eye socket and is completely independent of the prosthetic as far as physical or positive connection or association is concerned.

Another object of our invention is to provide a prosthetic and controlling apparatus therefor producing normal, realistic prosthetic movements, and to eliminate any physical or positive connections between the two elements of the apparatus.

And yet another characteristic and feature of our invention resides in the provision of a prosthetic and a separate controlling apparatus therefor whereby normal, realistic eye movements are imparted to the prosthetic, the controlling apparatus being seated in the inner portion of the eye socket in operative association with the eye muscles, and elements of the human eye structure being utilized to separate the controlling apparatus from the prosthetic and the exterior of the eye to thereby substantially eliminate the possibility of infection, or extrusion of the controlling apparatus.

A further characteristic of our invention resides in an enucleation process which retains the conjunctival membrane to close the inner eye socket in which the controlling element for the prosthetic is disposed.

Another object of our invention is to provide a prosthetic controlling element which is disposed within the inner portion of the eye socket and is of such construction as to receive in operative association the severed extra ocular muscles.

A further and primary object of our invention resides in the provision of magnetic means whereby muscle actuated movements of a controlling element or implant are transmitted to a prosthetic.

It is also an object of our invention to provide magnetic means whereby muscle actuated movements of a controlling element or implant disposed in the inner eye socket are transmitted to a prosthetic which is spaced and separated from the controlling element by the conjunctival membrane.

A still further object of our invention is to provide magnetic means acting through the conjunctival membrane for transmitting muscle controlled movements to a prosthetic.

Another object of our invention resides in the provision of a prosthetic and a controlling element therefor, each of which is provided with magnetic means whereby the movements of the controlling element under the control of the extra ocular muscles to which it is attached will be imparted to the prosthetic.

Another purpose of our invention is to provide a mobile prosthetic and a muscle connected and actuated element or implant for controlling movements of the prosthetic wherein the implant is disposed in the inner eye socket and the prosthetic is disposed outwardly thereof and in spaced relation relative thereto, the two elements being completely physically disassociated.

A further characteristic of our invention consists of the assembly of a prosthetic and controlling apparatus therefor in which the conjunctival membrane is used to seal the inner eye socket in which the controlling apparatus is positioned from the exterior.

It is also an object of our invention to provide a unitary prosthetic which is physically independent of a controlling element therefor but which embodies means subject to influences emitted by the controlling element to impart mobility to the prosthetic.

We have devised a prosthetic controlling element or implant which is so designed and constructed that it may be operatively associated with the extra ocular muscles with facility by the surgeon performing the enucleation.

We have also constructed the prosthetic controlling element or implant of light material having the necessary structural strength and body to carry magnetic means and to withstand any strains which may be applied thereto, and we have likewise formed the prosthetic of the necessary materials and body to carry magnetic means for co-action with the means carried within the implant.

With the foregoing general objects, features, and results in view, as well as certain others which will be apparent from the following explanation and detailed description of the accompanying drawings, the invention consists in certain novel features in design, construction, mounting and combination of elements, as will be more fully and particularly referred to and specified hereinafter.

Referring to the accompanying drawings:

Fig. 1 is a view in vertical section adjacent an eye socket with the controlling element or implant in position with the extra ocular muscles attached thereto, the prosthetic not being in position.

Fig. 2 is a view in front elevation of the controlling element or implant.

Fig. 3 is a side view in vertical section of the controlling element or implant.

Fig. 4 is a view in rear elevation of the controlling element or implant.

Fig. 5 is a view in rear elevation of a prosthetic embodying the features of this invention.

Fig. 6 is a side view in vertical section of the prosthetic illustrated in Fig. 5 of the drawings.

Fig. 7 is a view in vertical section adjacent an eye socket illustrating the entire assembly, including the prosthetic and controlling element or implant in operative positions.

In the process of removing an eye, which is known as enucleation, the eye ball is severed from its six extra ocular muscles, which are the structures or elements which impart mobility to the eye ball. In the enucleation process in order to reach the extra ocular muscles, it is essential to dissect off a thin membrane, known as the conjunctiva, from the anterior half of the eye ball. It will be evident that in this enucleation process, when the eye ball has been removed there remain the free ends of the six extra ocular muscles and the thin conjunctival membrane with an opening therein anteriorly, corresponding to the diameter of the eye, and the severed end of the optic nerve. Thus it will be recognized that there is an opening into the structure which surrounds the human eye which has been removed, and which for the purposes of this invention we will consider the inner socket.

Referring to the accompanying drawings, we have used the reference numeral 1 to designate generally the inner socket of the eye, which socket is surrounded by boney tissue 3 and fatty tissue 5. The surgeon performing the enucleation process and assembling the prosthetic and controlling element or implant after the eye removal, disposes an implant, which we have designated generally by the numeral 7, into the inner eye socket 1 and operatively associates the implant 7 with the free ends of the severed six ocular muscles in a manner to be hereinafter described in detail.

The controlling element or implant 7 comprises what we shall term a generally conical body portion 9 having an anterior flattened or plane base or working surface 11 and a rearward or interior dome-like surface 13. We preferably though not necessarily construct the implant 7 of a plastic material which is of light weight and endowed with sturdy characteristics. While we preferably form this implant of plastic material it is to be understood that such an element may be formed of materials other than plastic ones and such element would still fall within the spirit and scope of this invention. Any of the many plastics which have been found suitable in prosthesis work may be employed. The implant is formed with pairs of oppositely disposed fore and aft extending fins or flanges 17 which extend generally radially from the body 9 of the implant. As will be apparent from consideration of the drawings, and particularly Fig. 3 thereof, the flanges or fins 17 are shaped to extend in a gradual manner radially outwardly from the base 11 and interior dome 13 to a high point 14 generally intermediate the anterior and interior ends of the body of the implant. Formed integrally with the fins 17 are arcuate bridging elements 19 which function as muscle attaching members. These bridging elements 19 form in effect an annular structure extending around the implant connecting the high points of each of the fins, so that there is a bridging element 19 of arcuate form extending between and connecting adjacent fins.

From the description of the implant it will be appreciated that we have provided an element having muscle attaching members extending around the body of the implant and spaced therefrom to facilitate the attachment of the muscles to these members. It will also be understood that these bridging elements or muscle attaching members are positioned substantially mid way between the anterior and interior ends of the element.

Of further importance in connection with this prosthetic controlling element or implant is the configuration and shaping thereof and of the radially projecting fins. We have so designed these fins that they gradually extend radially from the ends of the body of the implant in such manner that no sharp edges, corners or the like occur in the implant, nor are any pockets formed therein where material of any sort might collect.

Imbedded within the body of the controlling element or implant 7 is a permanent magnet 21 preferably of the horseshoe type, the pole pieces or projecting legs 23 of the magnet extending or projecting anteriorly of the element to a point adjacent to the base 11 thereof. The ends of the pole pieces 23 are slightly disposed inwardly of the body of the implant inside the plane of the exterior surface of the base 11 of the implant. It will thus be appreciated that a magnet as described is completely contained within the body of the implant, and that the pole pieces 23 extend anteriorly of the body of the implant to a position close to the exterior surface of the base 11 but completely within the body of the implant. Thus the ends of the poles of the magnet are covered by the plastic material of the implant or by other material.

It is within the scope of our invention to provide an implant which in itself constitutes a magnet. That is, we may use as an implant a body of magnetized material instead of imbedding a magnet within a plastic body or a body formed of any other suitable material. Such an implant formed of a magnetized material may be of solid construction or hollow depending upon weight and other factors of the material selected.

After the removal of the eye ball in the enucleation process and the dissecting off of the thin membrane or conjunctiva which we shall designate with the reference numeral 25, the implant 7 is inserted into the eye socket through the opening in the membrane or conjunctiva and is positioned within the inner socket in readiness for operative attachment to the six ends of the extra ocular muscles 27. The implant 7 is disposed in operative position within the inner socket with the base or flat uninterrupted working surface 11 thereof extending forwardly or in anterior position, the dome-like end 13 thereof being rearwardly disposed and the bridging members 19 extending around the implant as particularly illustrated in Figs. 1 and 7 of the drawings. With the implant disposed in the inner socket the surgeon who is assembling the prosthetic and the implant in operative positions then attaches or ties the free ends of the six extra ocular muscles 27 to the bridging elements 19 as at 29. Each extra ocular muscle 27 is tied to a bridging element 19 and it will be evident, since in this particular embodiment, we have provided four of such bridging elements that two of the bridging elements may carry two of the muscles. It will of course be understood that the muscles exerting tension in a certain direction will be attached to the bridging element on the proper side of the implant so that the implant will be moved by the muscles in the desired directions. While we have shown an implant provided with four bridging elements it will be understood that we could provide more than four of such elements.

With the implant disposed in proper operative position as described, the extra ocular muscles being attached by tying or the like to the bridging members of the implant, it will be recognized that the muscular movements or tensions will be transmitted or imparted to the implant whereupon such implant will be induced to move or rotate within its seated position within the inner eye socket. We shall hereinafter specifically point out and clarify the purpose of providing the implant with the aforementioned mobility.

When the implant is seated in proper position within the inner eye socket and the muscles are operatively attached thereto as described, the opening in the conjunctival membrane is then completely closed over the implant by means of sutures. Figure 7 of the drawings illustrates in detail the particular arrangement of the implant relative to the conjunctival membrane 25 and consideration of this particular figure of the drawings discloses that when the membrane is closed by means of the sutures it will extend over the base or working surface 11 of the implant, and it will further be apparent that the poles 23 of magnet 21 which is carried by the implant will be adjacent to the closed conjunctival membrane. We desire to point out at this time that the sewed or closed conjunctiva provides a closure for the inner socket and the implant, and completely seals the same from the exterior.

The step in the method of association of the prosthetic in the assembly is reached upon the complete operative positioning of the implant and the closing of the conjunctiva 25. We have used the numeral 31 to designate in its entirety the prosthetic or artificial eye which we propose employing in association with the implant. The prosthetic is preferably though not necessarily formed of plastic material and includes the usual anterior eye ball simulation 33 from which extends an annular rearwardly deflected flange 35. A central rearwardly extending body portion 37 is provided with which we imbed or mount a permanent magnet 39 which is preferably of the horseshoe type having rearwardly projecting legs or pole pieces 41 which extend to but are inwardly removed from the plane of the exterior flat uninterrupted surface of the rear base or working surface 43 of the body member 37. Thus, the prosthetic of this invention involves a member provided with a rearwardly extending body in which is carried a magnet no part of which extends or projects to the exterior of the body. The body is formed with a flat rear surface and the magnet poles extend to points closely adjacent to surface. The surface 43 as will hereinafter become apparent is complementary to and cooperates with working surface 11 of the implant. The prosthetic may be provided with a magnet which is not imbedded in the material thereof. It is thus within the scope of our invention to provide a prosthetic carrying a magnet or magnetizable material on the rear thereof for co-action with the magnet of the implant. Also the rear or interior portions of the prosthetic may be formed of a magnetizable material.

The prosthetic 31 is adapted to be inserted into operative position within the space 45 which is defined by the conjunctiva 25 and the human eyelids 47. The prosthetic is inserted into this space or area 45 with the body 37 thereof extending rearwardly in such position that the plane surface or working face 43 thereof is disposed adjacent to and in contact with the conjunctiva which in turn is in contact with the anterior surface 11 of the implant. Obviously the cornea 33 of the prosthetic will extend outwardly in normal eye ball simulating position when the prosthetic is inserted in operative position within the area 45.

With the members of the assembly, that is the prosthetic and the implant, assembled in operative positions as described the operative or working surfaces 43 and 11 of the prosthetic and implant, respectively, will be positioned against one another but will be separated from actual contact by the conjunctival membrane 25 which extends between the working surfaces of the prosthetic and the implant. It will further be understood that with the prosthetic and the implant in operative positions the poles 41 and 23 of the magnets carried in prosthetic and implant, respectively, will be closely adjacent to one another but separated by the conjunctival membrane. The relative positioning of the prosthetic and implant are such that unlike poles of the magnets 23 and 39 are oppositely disposed so that they will attract one another.

The operative assembly as hereinabove described, which comprises the prosthetic and the implant will function to produce realistic and normal appearing mobility or eye movements to the prosthetic. When the tensioning of certain of the extra ocular muscles 27 occurs, the implant 7 will be moved or rotated accordingly and the magnetic flux or influences flowing from the poles 23 of the magnet 21 of the implant through the conjunctiva will attract the unlike poles 41 of the magnet 39 of the prosthetic 31 to thereby transmit movements to such prosthetic corresponding to and co-ordinated with those induced in the implant by the attached muscles. Thus, we have devised an arrangement producing normal and realistic eye movements to a prosthetic, such movements being initiated and induced by a muscle actuated implant which is completely physically disconnected from the prosthetic, the movement being transmitted from the implant through the conjunctiva to the prosthetic entirely by magnetic means. It will be understood that the permanent magnet 39 which is carried within the prosthetic could be eliminated and a magnetizable metal substituted therefor.

By the structure and assembly and mounting of the various elements of our invention with the conjunctiva extending over the inner eye socket and separating the implant from the prosthetic we have eliminated the possibility of the extrusion of the implant from the inner eye socket and we have also eliminated the possibility of the occurrence of infection due to the fact that by the utilization of the conjunctival membrane we have completely closed off the inner eye socket and the implant. It will of course be appreciated that the closure of the inner eye socket by the conjunctiva forms a complete barrier against the extrusion of the implant, for the same will bear against the plane or working surface of the implant to resist extrusion thereof.

Our invention provides an assembly which produces prosthetic movements in harmony with those of the user's remaining human eye, the movements are therefore substantially normal and realistic appearing. It will be apparent to those skilled in this art that the art of prostheses has been advanced by this invention which provides prosthetic movements governed and actuated by the muscle initiated movements of an implant, without requiring physical connection of any character whatsoever between the implant and the prosthetic and while actually sealing off the inner eye socket and separating the implant from the prosthetic by a human membrane retained during the enucleation process. Furthermore, this forward step in this art has been accomplished without adding to the complexity or dangers of the enucleation process, and no additional discomfort will be felt by the patient during the operation and assembly or while using the apparatus.

We claim:

1. An implant adapted to be inserted in the inner portion of the socket remaining after removal of the eye for inducing movements in a prosthetic, said implant carrying a permanent magnet, and means on said implant for operative connection with the extra ocular muscles for movement of the implant by the muscles.

2. An implant adapted to be inserted in the inner portion of the socket remaining after removal of the eye for inducing movements in a prosthetic, said implant having a permanent magnet wholly imbedded therein, and means on said implant for operative connection with the extra ocular muscles for movement of the implant by the muscles.

3. An implant adapted to be inserted in the inner portion of the socket remaining after removal of the eye for inducing movements in a prosthetic, said implant having a permanent magnet wholly embedded therein, the poles of the magnet disposed adjacent to the anterior surface of the implant, and means on said implant for operative connection with the extra ocular muscles for movement of the implant by the muscles.

4. An implant adapted to be inserted in the innermost portion of the socket remaining after removal of the eye, said implant including magnetic means and formed with structure for operative association with the extra ocular muscles for movement of the implant by the muscles, the movement of the implant adapted to induce corresponding movements to a prosthetic having means within the field of said magnetic means for influence thereby.

5. An implant adapted to be inserted in the inner portion of the socket remaining after removal of the eye for imparting movement to a prosthetic, said implant including a body portion having a flat anterior working surface, a magnet carried in said body portion with the poles thereof adjacent said working surface, and means carried by said implant and spaced therefrom for operative connection to the extra ocular muscles for movement of the muscles by the implant.

6. An implant adapted to be inserted in the inner portion of the socket remaining after removal of the eye for inducing movements in a prosthetic, said implant including a magnet, and means on said implant for operative connection with the extra ocular muscles for movement of the implant by the muscles.

7. An implant adapted to be inserted in the inner portion of the socket remaining after removal of the eye for inducing movements in a prosthetic, said implant including means producing a magnetic force anteriorly thereof, and means on said implant for operative connection with the extra ocular muscles for movement of the implant by the muscles.

8. An implant adapted to be inserted in the inner portion of the socket remaining after removal of the eye for inducing movements in a prosthetic, said implant embodying means emitting magnetic forces, and means on said implant for operative connection with the extra ocular muscles for movement of the implant by the muscles.

9. A prosthesis, including in combination, an implant adapted to be inserted in the inner portion of the socket remaining after removal of the eye, said implant adapted to be operatively connected with the extra ocular muscles for imparting movement to the implant and the implant including means emitting magnetic forces, and a prosthetic adapted to be disposed in the eye socket anteriorly of said implant, said prosthetic including magnetizable means within the field of said magnetic forces for influence thereby to impart movement to the prosthetic coordinated with the muscle actuated movements of the implant.

10. A prosthesis, including in combination, an implant adapted to be inserted in the inner portion of the socket remaining after removal of the eye, said implant adapted to be operatively connected with the extra ocular muscles for imparting movement to the implant and the implant including means emitting magnetic forces anteriorly thereof, and a prosthetic adapted to be disposed in the eye socket anteriorly of said implant, said prosthetic including magnetizable means in the rear thereof within the field of said magnetic forces for influence thereby to impart movement to the prosthetic coordinated with the muscle actuated movements of the implant.

11. A prosthesis, including in combination, an implant adapted to be inserted in the inner portion of the socket remaining after removal of the eye, said implant adapted to be operatively connected with the extra ocular muscles for imparting movement to the implant and the implant having a body portion including an anterior working surface, magnetic means carried by said implant adjacent said working surface for emitting magnetic forces anteriorly of the implant, and a prosthetic adapted to be disposed in the eye socket anteriorly of said implant and having a body portion provided with a rear working surface complementary to the working surface on the body of the implant, said prosthetic including magnetizable means adjacent said working surface within the field of said magnetic forces for influence thereby to impart movement to the prosthetic coordinated with the muscle actuated movements of the implant.

12. A prosthesis, including in combination, an implant adapted to be inserted in the inner portion of the socket remaining after removal of the eye, said implant adapted to be operatively connected with the extra ocular muscles for imparting movement to the implant and the implant having a body portion including an anterior working surface, magnetic means carried by said implant adjacent said working surface for emitting magnetic forces anteriorly of the implant, and a prosthetic adapted to be disposed in the eye socket anteriorly of said implant and having a body portion provided with a rear working surface complementary to the working surface on the body of the implant, the working surfaces of said implant and prosthetic in operative positions in abutting relation adapted to be so positioned with the conjunctiva extending therebetween, said prosthetic including magnetizable means adjacent said working surface within the field of said magnetic forces for influence thereby to impart movement to the prosthetic coordinated with the muscle actuated movements of the implant.

13. A prosthesis, including an implant adapted to be inserted in the inner portion of the socket remaining after removal of the eye, said implant including a body portion, pairs of oppositely disposed fins extending radially from end to end of the body, bridging members extending between adjacent fins and spaced from the body, said bridging members adapted to be operatively connected to the extra ocular muscles for movement of the implant by the muscles, a prosthetic, and means for imparting movements thereto corresponding to the muscle induced movements of the implant.

14. A prosthetic adapted to be movably influenced by means included in an implant disposed in the inner portion of the socket remaining after removal of the eye, the implant being operatively associated with the extra ocular muscles, said prosthetic having a permanent magnet wholly embedded therein, the poles of the magnet disposed adjacent a rear surface of the prosthetic for movable influence by the means included in the implant to cause movement of the prosthetic corresponding to the muscular induced movements of the implant.

15. A prosthetic adapted to be movably influenced by means included in an implant disposed in the inner portion of the socket remaining after removal of the eye, the implant being operatively associated with the extra ocular muscles, said prosthetic including a body portion having a flat rear working surface, a magnet carried in said body portion with the poles thereof adjacent said working surface for movable influence by the means including in the implant to cause movement of the prosthetic corresponding to the muscular induced movements of the implant.

16. A prosthesis, including in combination, an implant member adapted to be inserted in the inner portion of the socket remaining after removal of the eye, said implant member adapted to be operatively connected with the extra ocular muscles for inducing movements to the implant member responsive to tensions of the extra ocular muscles, and a prosthetic member adapted to be disposed in the eye socket anteriorly of said implant member, one of said members including means emitting magnetic forces and the other of said members including magnetizable means within the field of the magnetic forces.

17. An implant, for inducing movements in a visible prosthetic eye portion having magnetizable material therein, adapted to be inserted in the inner portion of the socket remaining after removal of an eye, said implant immovably carrying a permanent magnet, said magnet having pole faces effective at a face of the implant which is adapted to be opposed to a face of the visible prosthetic eye portion, and means on the implant for connection to ocular muscles for movement of the implant by the muscles.

18. A visible prosthetic eye portion fixedly carrying a permanent magnet and adapted to have movements imparted to the magnet and its associated eye portion by an implant portion containing magnetizable material and which implant portion has means for connection with ocular muscles, said visible eye portion having pole faces of the magnet effective at a face of the eye portion which is opposite to the visible portion.

19. An eye prosthesis, including in combination: an implant portion adapted to be inserted into the inner portion of the socket remaining after the removal of an eye and having means for connection with ocular muscles for movement of the implant by the muscles, and an eye simulating portion having a visible portion and a non-visible face and adapted to have its non-visible face opposed to a face of the implant portion; a permanent magnet carried by one of said portions having its pole faces effective at the face of said portion and a magnetizable material carried by the other of said portions and effective at the face of said other portion, whereby movement imparted to the implant portion by the ocular muscles, after connection therewith, will cause concurrent movement of the eye simulating portion.

EMANUEL P. ROSEN.
EDWIN H. ERICKSON.

References Cited in the file of this patent

UNITED STATES PATENTS

| Number | Name | Date |
|---|---|---|
| 1,379,741 | Bourdeaux | May 31, 1921 |
| 2,322,117 | Dimitry | June 15, 1948 |

FOREIGN PATENTS

| Number | Country | Date |
|---|---|---|
| 19,625 | Great Britain | Nov. 1, 1892 |

OTHER REFERENCES

Ruedemann, A. D.: Plastic Eye Implant, American Journal of Ophthalmology, August 1946, pages 947–952. (Copy in Division 55.)